United States Patent [19]

Lockard

[11] Patent Number: 5,272,945
[45] Date of Patent: Dec. 28, 1993

[54] TOOLHOLDER ASSEMBLY AND METHOD

[75] Inventor: Thomas A. Lockard, Raleigh, N.C.

[73] Assignee: Kennametal Inc., Latrobe, Pa.

[21] Appl. No.: 935,958

[22] Filed: Aug. 26, 1992

[51] Int. Cl.$^5$ .................. B23B 1/00; B23B 29/04; B23Q 11/10
[52] U.S. Cl. .................. 82/1.11; 82/160; 82/901; 407/11
[58] Field of Search .................. 82/1.11, 158, 160, 901; 407/11, 117; 409/135, 136

[56] References Cited

U.S. PATENT DOCUMENTS

| | | | |
|---|---|---|---|
| 1,119,669 | 12/1914 | Wigness | 82/152 |
| 2,851,764 | 9/1958 | White | 407/11 |
| 2,924,873 | 2/1960 | Knowles | 407/11 |
| 3,893,355 | 7/1975 | Maastricht | 82/137 |
| 4,213,354 | 7/1980 | Dahinden | 82/1.11 |
| 4,636,118 | 1/1987 | Hunt | 409/136 |
| 4,668,135 | 5/1987 | Hunt | 409/136 |
| 4,674,371 | 6/1987 | Smolders | 82/158 |
| 4,695,208 | 9/1987 | Yankoff | 407/106 |
| 4,778,315 | 10/1988 | Duffy et al. | 82/901 |
| 4,848,198 | 7/1989 | Royal et al. | 407/11 |
| 5,033,917 | 7/1991 | McGlasson et al. | 408/67 |
| 5,079,828 | 1/1992 | Kubo et al. | 483/13 |
| 5,148,728 | 9/1992 | Mazurkiewicz | 82/1.11 |

FOREIGN PATENT DOCUMENTS

| | | | |
|---|---|---|---|
| 3033626 | 4/1982 | Fed. Rep. of Germany | 407/11 |
| 1279749 | 11/1961 | France | 407/11 |
| 80896 | 5/1963 | France | 407/11 |
| 323998 | 10/1957 | Switzerland | 407/11 |
| 1454651 | 1/1989 | U.S.S.R. | 409/136 |

OTHER PUBLICATIONS

Pp. 20 and 21 of recent Sandvik Catalog entitled "New Turning Tools and Inserts" (no date).

*Primary Examiner*—Bruce M. Kisliuk
*Assistant Examiner*—Bryan Reichenbach
*Attorney, Agent, or Firm*—James G. Porcelli

[57] ABSTRACT

An improved toolholder assembly and method is provided that comprises an adjustable nozzle for redirecting a liquid coolant stream from a direction generally parallel or slightly oblique with respect to the axis of rotation of a workpiece to a direction that is substantially orthogonal with respect to this axis. The nozzle assembly includes a threaded base on one end and a nozzle head on the other, and the threaded base may be screwed into or out of a threaded opening in the toolholder body which communicates with the original coolant stream opening in order to adjust the nozzle head at both a desired angle in a plane orthogonal with respect to the axis of rotation of the workpiece, as well as at a desired point along this axis. The invention is particularly useful in combination with toolholders having cutting inserts that perform deep grooving, threading, and cut-off operations, as the angular and axial adjustment features of the nozzle assembly allow the nozzle head to project a stream of coolant that is optimally orthogonally positioned with respect to the interface between the cutting insert and the workpiece regardless of the depth of the cut and for a variety of cutting inserts. Such optimal positioning in turn optimizes the ability of the coolant stream to lubricate the cutting interface and to remove heat and metal chips at all times during the cutting operation of the insert.

11 Claims, 3 Drawing Sheets

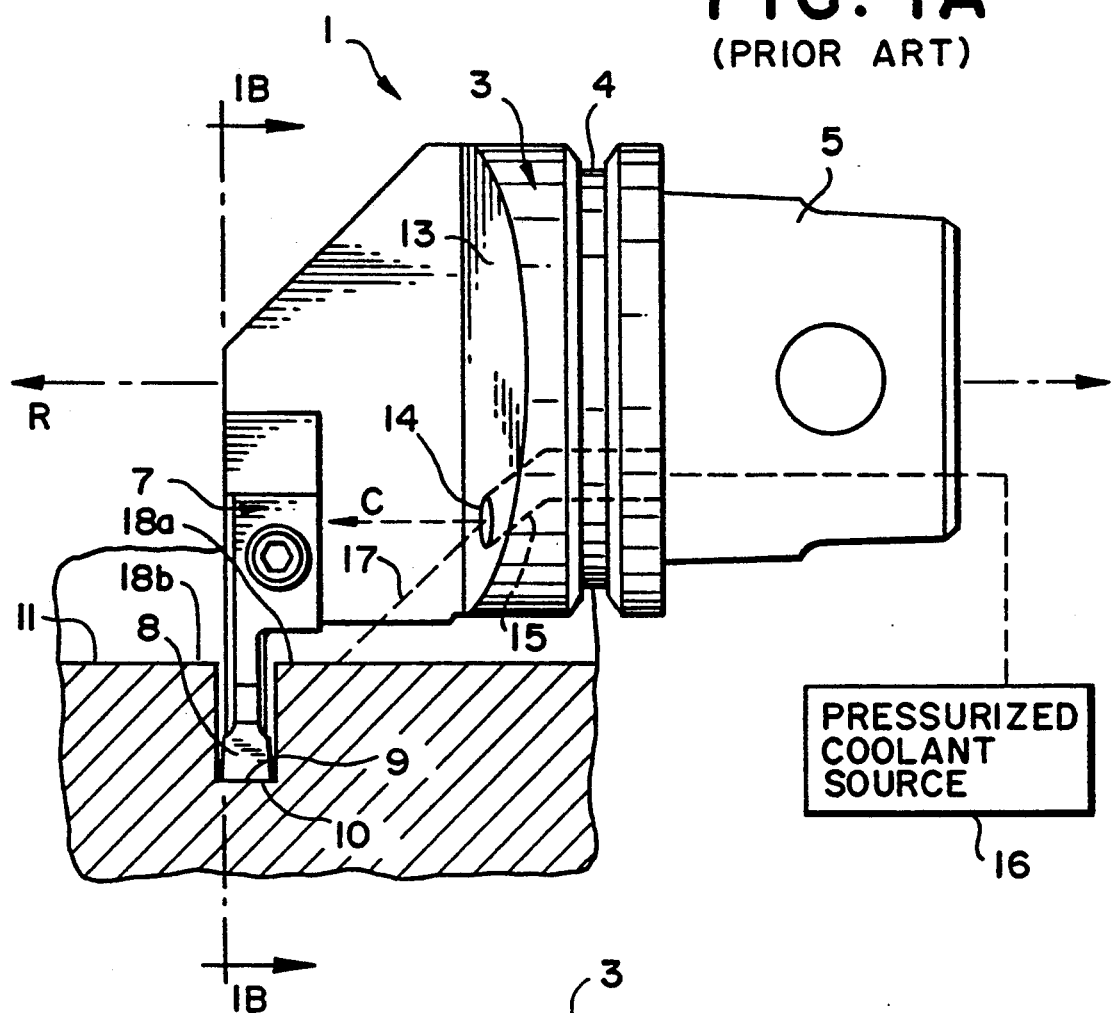
FIG. IA
(PRIOR ART)
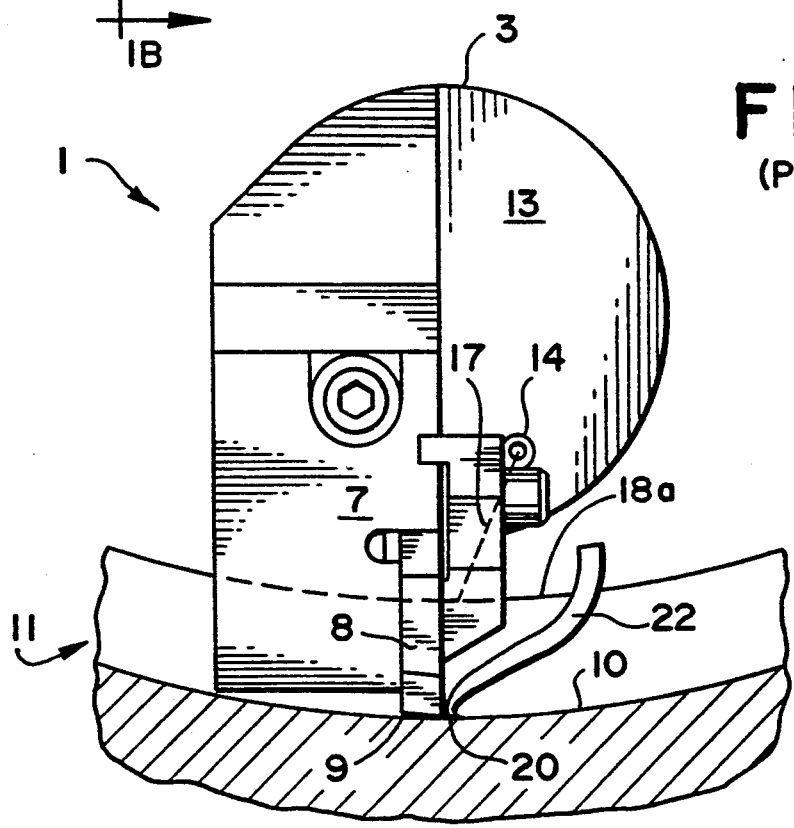
FIG. IB
(PRIOR ART)

TOOLHOLDER ASSEMBLY AND METHOD

BACKGROUND OF THE INVENTION

This invention generally relates to an improved toolholder assembly and method, and is specifically concerned with an improved toolholder assembly comprising a nozzle assembly for advantageously redirecting the coolant stream to optimize lubrication, heat removal and chip removal when deep cuts are made in a relatively rotating workpiece.

Toolholder assemblies having an opening for directing a liquid coolant stream at a cutting interface are known in the prior art. Such toolholder assemblies generally comprise a toolholder body having a clamping arrangement on one side for detachably mounting any one of a number of cutting inserts, a shank on its other side for detachably mounting the toolholder assembly to a machining mechanism that moves the toolholder with respect to a rotating workpiece in order to groove, thread, or cut off the same, and a coolant opening on the side of the toolholder body that faces the insert-holding clamp for directing a stream of liquid coolant at the interface between the cutting edge of the insert and the workpiece. The liquid coolant used is typically a water soluble-oil which advantageously serves to lubricate the interface between the cutting edge of the insert and the workpiece, as well as to remove heat and metal chips which would accelerate the wear of the cutting insert and interfere with and degrade the quality of the cut. The coolant-directing opening in the toolholder body is typically connected to a source of pressurized coolant through a coolant bore or passageway which extends all the way through the toolholder body and the shank which connects it to the machining mechanism.

In such conventional toolholder assemblies, the coolant opening directs the stream of coolant at an angle having directional components which are both orthogonal to and parallel with the axis of rotation of the workpiece, which in turn causes the stream of coolant to impinge on the interface between the cutting insert and the workpiece at an angle which is oblique with respect to the workpiece axis of rotation. The applicant has observed that, while such an oblique coolant stream adequately lubricates, cools and removes the metal chips when relatively shallow cuts are made on the workpiece, such an oblique-angled coolant stream becomes progressively less effective the deeper that the cutting insert cuts into the workpiece as the shoulders of metal on either side of the cut tend to interfere with the direct impingement of the coolant stream on the cutting interface. While some if not most of the coolant might succeed in flowing over the interfering shoulder in the workpiece and trickle down into the cutting interface, such a trickling flow of coolant is decidedly less effective in providing the lubricating, heat removing and chip removing functions that a directly impinging stream of coolant performs. Hence, the quality of the resulting cut in the workpiece may be seriously impaired, and wear on the cutting insert is increased.

Clearly, what is needed is a means for modifying a conventional toolholder assembly to redirect the stream of coolant from the coolant opening in the toolholder body so that it is capable of directly impinging the interface between the cutting insert and the workpiece regardless of the depth of the cut. Ideally, such a modification mechanism should be capable of adjusting the angle of the coolant stream not only in a plane orthogonal with respect to the axis of rotation of the workpiece, but linearly along this axis as well so as to be able to project a directly impinging stream of coolant into the interface for a variety of cutting inserts having a variety of different shapes. Finally, it would be desirable if the modification mechanism were simple in construction, and capable of being retrofitted onto the body of a prior art toolholder assembly with a minimum amount of machining effort and with a minimum amount of interference with the working profile of the toolholder assembly so that the maneuverability of the assembly is not significantly impaired.

SUMMARY OF THE INVENTION

Generally speaking, the invention is an improved toolholder assembly of the type including a toolholder body having a cutting insert with a rake force having an edge for cutting a workpiece that moves rotationally relative to the insert, and a coolant-conducting bore that terminates in an opening for directing a liquid coolant stream at the interface between the cutting edge and the workpiece in a direction having a component motion parallel with the axis of relative rotation, wherein the improvement comprises a nozzle assembly for redirecting the coolant stream toward the interface in a path that is substantially orthogonal with respect to the axis of relative rotation.

The nozzle assembly preferably includes a means for adjusting both the angle of the stream in a plane that is substantially orthogonal with respect to the axis of relative rotation, as well as for adjusting the path of the stream along the axis of relative rotation. The adjustment means of the nozzle assembly includes a threaded base having one end which is rotatably moveable in a threaded opening in the toolholder body in a direction parallel to the axis of relative rotation. The other end of the threaded base includes a nozzle head for directing the stream of coolant, and movement of the nozzle head in directions which are both orthogonal and parallel with respect to the axis of relative rotation is accomplished merely by screwing the threaded base of the nozzle assembly clockwise or counterclockwise with respect to the threaded opening in the toolholder body.

Where possible, the threaded opening is formed integrally with the original coolant opening to facilitate the retrofitting of the nozzle assembly in a conventional toolholder body. A locking means in the form of a lock nut is preferably provided around the threaded base in order to secure the head of the nozzle assembly at a selected angular orientation, and at a selected point along the axis of relative rotation between the workpiece and the toolholder assembly. Further, the pitch of the threads present on the threaded base is preferably no more than 1.0 mm per turn in order to assure the presence of a number of fine adjustments for the position of the nozzle head.

In the method of the invention, a toolholder body of a conventional toolholder assembly is modified by the creation of a threaded opening in the body that communicates with the coolant-conducting bore in the holder capable of receiving the threaded base of the nozzle assembly. The location of the threaded opening is selected to afford manual access to the nozzle head while minimally interfering with the maneuverability of the completed modified toolholder assembly. In toolholders of the type having a recessed portion between the middle of the toolholder body and the clamping assembly that mounts the cutting insert, the threaded opening is located on a side of the tool body such that the nozzle assembly is located in the recessed portion of the tool body. In one embodiment of the method of the invention, the threaded bore is formed in the conventional toolholder body by widening and threading the end of the existing coolant opening so that it can receive the threaded base of the nozzle assembly. In another embodiment of the method, the existing coolant opening is plugged and the threaded is located at another location on the toolholder body. In the subsequent steps of the method, the position of the nozzle head is adjusted to redirect the stream of flowing coolant so that it strikes the interface between the cutting insert and the workpiece in a plane orthogonal with respect to the axis of relative rotation. Such an adjustment is performed by screwing the threaded base of the nozzle assembly into or out of the threaded opening in the toolholder body.

Both the improved toolholder assembly and related method are particularly useful when used in combination with a toolholder assembly having a cutting insert for performing grooving, threading, or cutoff operations where the shoulders on either side of the relatively deep cut in the workpiece would interfere with an obliquely oriented stream of coolant. The method of the invention facilitates the rapid conversion of a conventional toolholder assembly into one modified in conformance with the apparatus of the invention, which advantageously provides a coolant stream that efficiently and effectively lubricates the cutting operation while removing both excess heat and metal chips regardless of how deeply the cutting insert cuts the workpiece. Additionally, the profile of the resulting modified assembly is not changed in a manner which significantly interferes with the maneuverability of the assembly.

BRIEF DESCRIPTION OF THE SEVERAL DRAWINGS

FIG. 1A is a top view of a prior art toolholder assembly cutting a groove in a workpiece wherein the stream of coolant is prevented from directly impinging at the interface between the cutting insert and the workpiece by a shoulder in the workpiece defined by the groove;

FIG. 1B is an end view of the prior art toolholder assembly illustrated in FIG. 1A along the line 1B—1B;

Figure 4A:
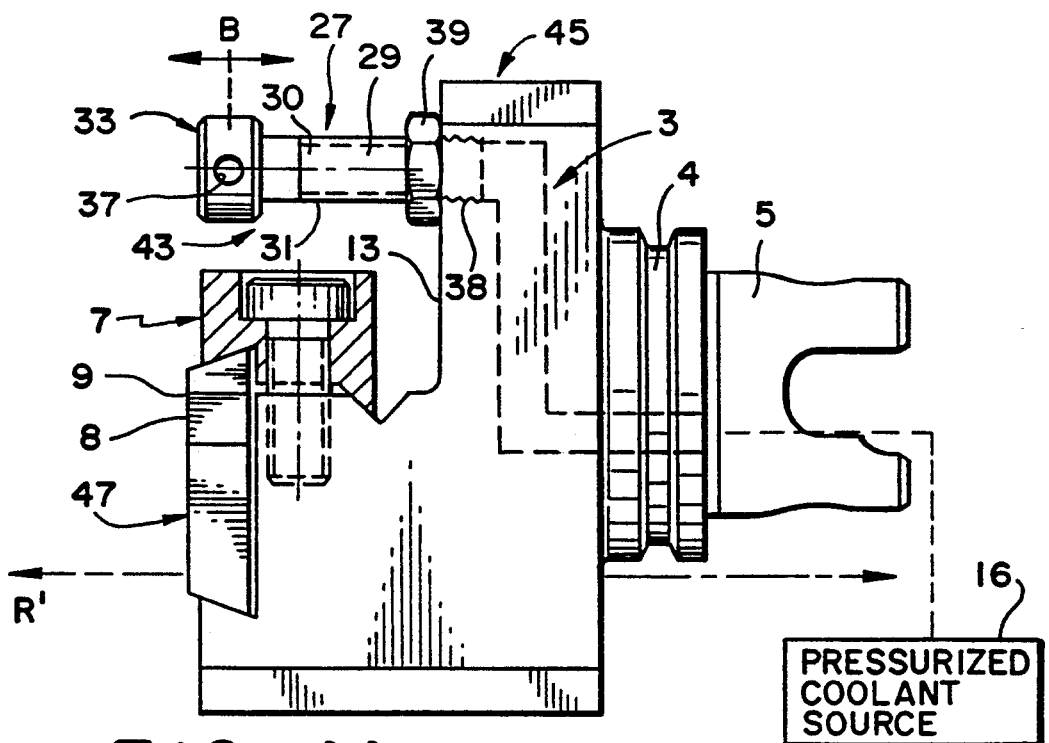
Figure 4B:
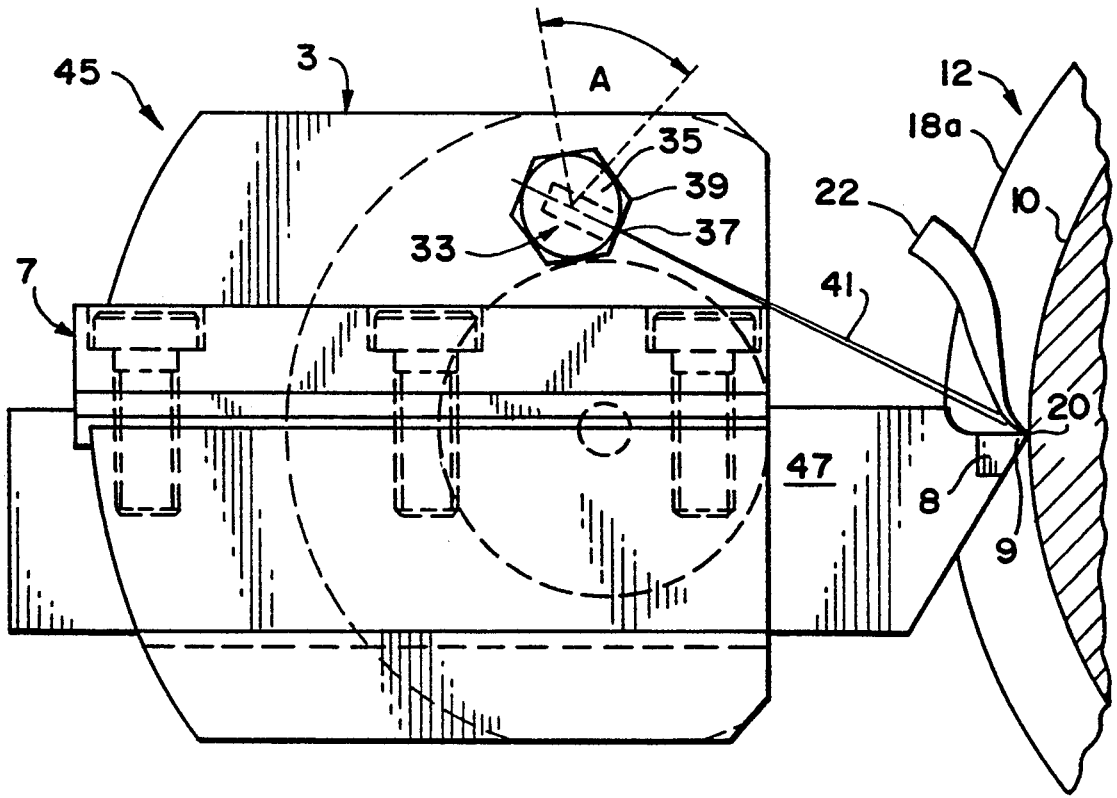

FIG. 4A is a side view of another embodiment of the improved toolholder assembly of the invention of a type used to perform cutoff operations which likewise employs a nozzle assembly to direct a stream of coolant orthogonally with respect to the relative axis of rotation between the workpiece and the toolholder assembly, and FIG. 4B is an end view of the improved toolholder assembly illustrated in FIG. 4A.

DETAILED DESCRIPTION OF THE PREFERRED EMBODIMENT

A brief description will first be made of the prior art toolholder assembly illustrated in FIGS. 1A and 1B before the invention is described in order that both the structure and the advantages of the invention may be more fully appreciated. Such prior art toolholder assemblies 1 generally comprise a toolholder body 3 machined from steel which includes a gripping groove 4 in its middle portion, a tapered shank 5 on one side, and a clamping assembly 7 on its other side. The gripping groove allows a robotic gripper to insert or withdraw the tapered shank 5 from a machining mechanism (not shown) in order to groove, thread, or cut a workpiece. The clamping assembly 7 detachably mounts a cutting insert 8 to the toolholder body 3 which has a cutting edge 9 for cutting a groove 10 in a workpiece 11. In the instant example of the prior art, the workpiece 11 is pipe-like; and the machining mechanism pushes the toolholder assembly 1 into the inner diameter of the workpiece 11 while the workpiece 11 is rotated by a lathe (not shown) about an axis that is parallel to the line R in order to cut a groove 10 around the inner diameter of the workpiece 11.

A coolant opening 14 is provided on the side 13 of the toolholder body 3 facing the clamping assembly 7 and the cutting insert 8. This coolant opening 14 is the termination of a coolant passageway (not shown) formed in part by a bore 15 within the toolholder body 3 that is obliquely oriented with respect to the axis of rotation. Both this bore 15 and the coolant opening 14 are connected to a source of pressurized coolant 16 which may be, for example, a water soluble oil such that the coolant port 14 discharges a pressurized stream of coolant 17 toward the interface 20 between the cutting edge 9 of the insert 8 and the bottom of the groove 10 in the workpiece 11.

At the beginning of the grooving or cutting operation, when the resulting groove is shallow, the obliquely-oriented coolant stream 17 impinges the interface 20 between the edge 9 of the insert 8 and the bottom of the groove 10 and thereby effectively lubricates and cools the cutting edge 9 of the insert while assisting in the removal of unwanted metal chips 22. However, as the groove 10 penetrates deeper into the workpiece 11, the annular shoulders 18a,b of metal defined on either side of the groove 10 become higher and higher with respect to the bottom of the groove 10 until the shoulder 18a disposed between the cutting insert 8 and the coolant port 14 finally completely interferes with the direct impingement of the coolant stream 17 onto the interface 20 between the workpiece 11 and the cutting edge 9. While some coolant is able to roll over the shoulder 18a and dribble into the groove 10, such a dribbling stream of coolant is far less effective in lubricating and cooling the interface 20 between the insert 8 and the workpiece 11, and is further far less effective in removing the metal chips 22 created as a result of the grooving operation. As a result, the cutting edge 9 of the insert dulls more quickly than if the coolant stream 17 had impinged directly on the interface 20 thereby necessitating more frequent insert replacement. Additionally, the diminished ability of the coolant stream 17 to remove the metal chips 22 can cause expensive interruptions to occur during the cutting operation.

Figure 2A:
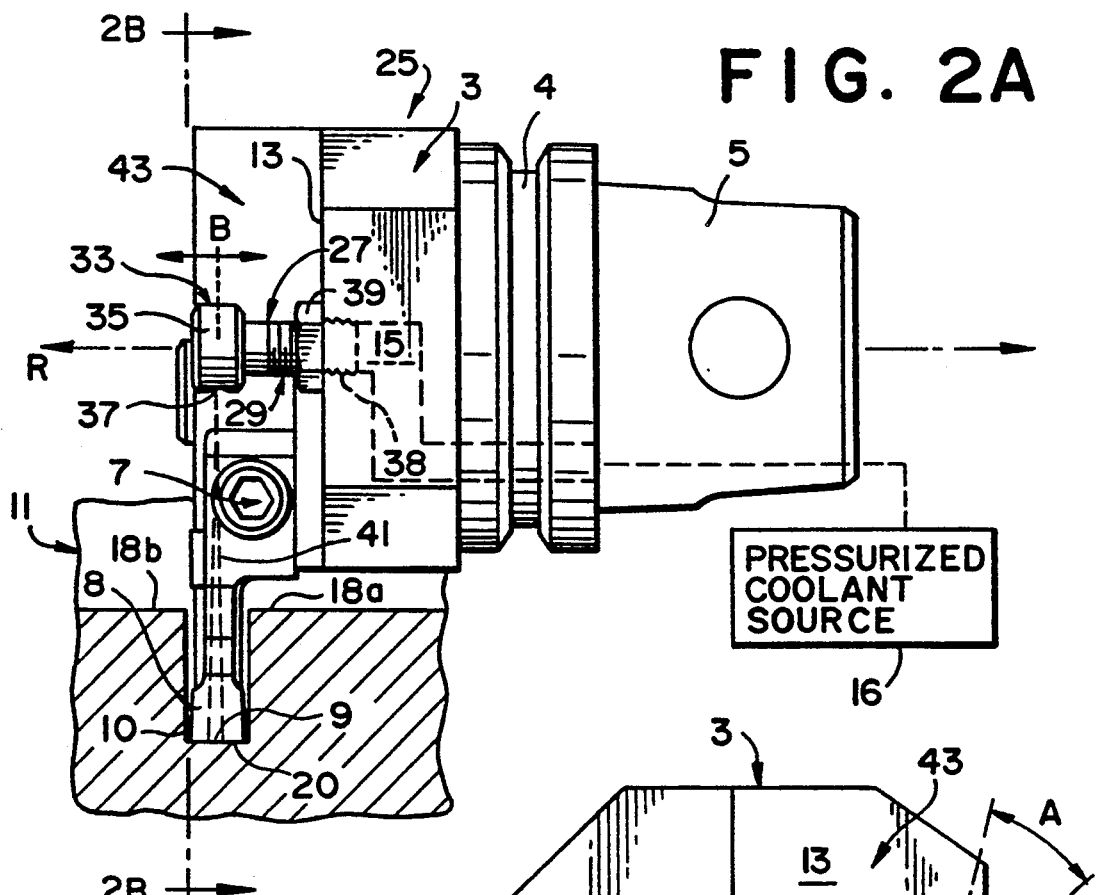
FIG. 2A is a top view of one embodiment of the improved toolholder assembly of the invention which utilizes a nozzle assembly for redirecting the coolant stream at the interface between the cutting insert and the workpiece in a path that is substantially orthogonal with respect to the axis of relative rotation between the improved toolholder assembly and the workpiece.
Figure 2B:
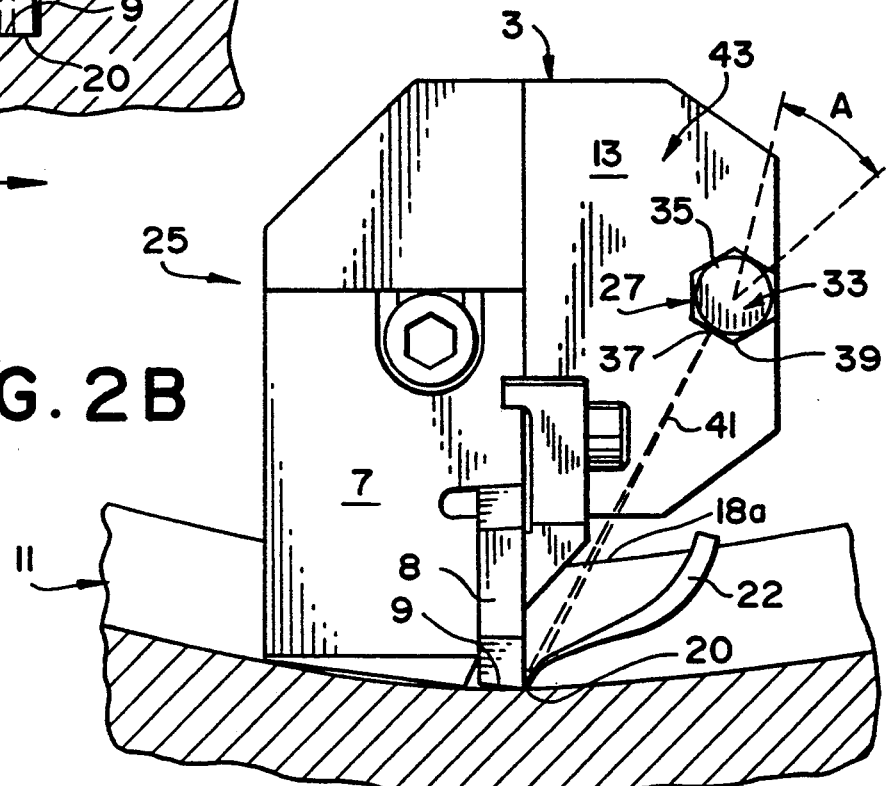
FIG. 2B is an end view of the improved toolholder assembly of FIG. 2A along the line 2B—2B.
Figure 3:
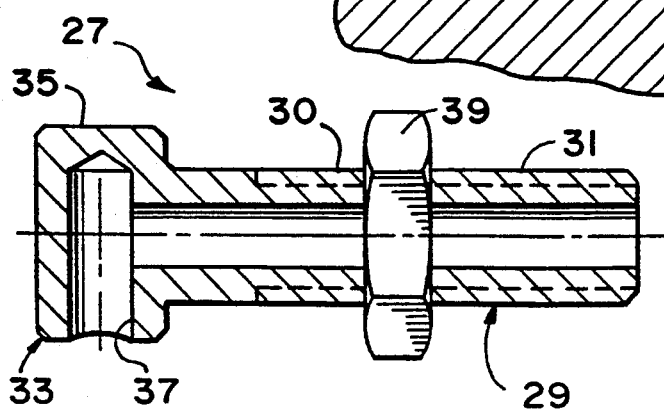
FIG. 3 is a side, cross-sectional view of the nozzle assembly used in the improved toolholder assembly illustrated in FIGS. 2A and 2B.

With reference now to FIGS. 2A and 2B, the improved toolholder assembly 25 of the invention includes all of the same parts as the previously described prior art assembly 1, with the exception that the coolant port 14 is replaced with a nozzle assembly 27. The nozzle assembly 27 has a threaded base 29 which may be formed from a cylindrical conduit 30 having a screw thread 31 that extends all the way down through its distal end. A nozzle head 33 is integrally formed on the proximal end of the cylindrical conduit 30. The nozzle head 33 includes a flat, cylindrical member 35 having a coolant port 37 whose cross-sectional area is approximately the same as the cross-sectional area of the coolant port 14 incorporated within the toolholder body 3 of the prior art tool assembly 1. The coolant port 37 communicates with threaded opening 38 into which the threaded exterior 31 of the distal end of the cylindrical conduit 30 of the nozzle assembly 27 may be screwed in fluid-tight engagement. In the preferred embodiment, the exterior diameter of the cylindrical conduit 30 is 6 mm, and the pitch of the threads on the threaded exterior 31 is 1.0 mm (0.39 inches) per rotation for a purpose which will become evident hereinafter. Finally, a lock nut 39 is also provided around the threaded exterior 31 of the base 29 in order to secure the nozzle head 33 in a desired position both radially with respect to an angle A located in a plane orthogonal to the axis line R, (as shown in FIG. 2B), and axially with respect to R as indicated by the arrow B in FIG. 2A.

In operation, the nozzle assembly 27 is first mounted in a recessed portion 43 of the toolholder body 3 located between the side wall 13 and the clamping assembly 7. This is accomplished by screwing the distal end of the threaded exterior 31 of the nozzle assembly 27 into the threaded opening 38 in the toolholder body 3 in a direction parallel to the axis R. The nozzle assembly 27 is turned until the nozzle port 37 is aligned with the interface 20 between the cutting edge 9 of the insert 8 and the workpiece 11 (as indicated by arrow B in FIG. 2A). Next, the operator turns the nozzle head 33 until the opening 37 is radially aligned with the interface 20, as is generally indicated by adjustment angle A in FIG. 2B. The 1.0 mm screw pitch of the threaded exterior 31 is a sufficiently fine pitch so that the radial adjustment of the nozzle head 33 does not substantially alter the axial adjustment of the nozzle head 33 along the line B. Such an alignment procedure will result in the discharge of a coolant stream 41 which is orthogonal with respect to the relative axis of rotation R between the improved toolholder assembly 25 and the workpiece 11 which directly impinges in the interface 20 between the cutting edge 9 of the insert 8, and the workpiece 11 just under the metal chips 22 which are created during the grooving operation.

Of course, the invention is equally applicable for grooving the outer diameter of cylindrical workpieces. Although not preferred, it is conceivable that the invention could be applied in operation where the toolholder assembly 1 is orbitally rotated relative to a stationary workpiece 11, provided the relative rotation is slow enough so as not to create centrifugal forces that will misalign and dissipate the coolant stream.

FIGS. 4A and 4B illustrate a second embodiment 45 of the improved toolholder assembly of the invention, wherein the toolholder body 3 is of the type designed to clamp onto an insert support member 47 that performs cutoff operations on workpieces 12 that rotate around an axis that is parallel to the line R1. As was the case with the toolholder assembly 25 illustrated in FIGS. 2A and 2B, the nozzle assembly 33 is mounted in a recessed portion 43 of the toolholder body 3 in order to minimally interfere with the profile of the resulting toolholder assembly. Both the longitudinal and the radial adjustments to the nozzle head 33 of the nozzle assembly 27 are made exactly as described with respect to the embodiment of the invention shown in FIGS. 2A and 2B.

In one embodiment of the method of the invention, the improved toolholder assembly of the invention is formed from a prior art tool assembly by redrilling and tapping the existing coolant bore 15 so that it is parallel to the axis of relative rotation between the toolholder assembly 1 and the workpiece 11. The threaded base 29 of a nozzle assembly 27 is then screwed into such a threaded bore in order to mount the same into the toolholder body 3. The orientation of the coolant port 37 is then adjusted as described with respect to the embodiment illustrated in FIGS. 2A and 2B. In the alternative, in instances where the coolant port 14 of the prior art toolholder body 3 is positioned on the side wall 13 such that it is impossible or very difficult to mount a nozzle assembly 27, the coolant port 14 may be plugged, and a new set of coolant-conducting bores is drilled through the toolholder body 3 to create a threaded opening 38 which is positioned on the side 13 of the toolholder body 3 to afford manual access to the nozzle head 33 without substantially interfering with the profile and maneuverability of the resulting toolholder assembly.

The present invention may, of course, be carried out in other specific ways than those herein set forth without departing from the spirit and essential characteristics of the invention. The present embodiments are, therefore, to be considered in all respects illustrative and not restrictive, and all changes coming within the meaning and equivalency range of the appended claims are intended to be embraced therein.

What is claimed is:

1. An improved toolholder assembly of the type including a toolholder body having a cutting insert with a rake face having an edge for cutting a workpiece that moves rotationally relative to said insert about an axis, wherein cuts made in said workpiece define at least one shoulder portion in said workpiece, and an opening means for directing a liquid coolant stream at an interface between said cutting edge and said workpiece to lubricate and cool said interface and to remove chips formed as a result of said cutting, said stream having a component of motion parallel with the axis of rotation, wherein the improvement comprises a nozzle assembly means detachably connectable to said opening means in said toolholder body for redirecting said coolant stream at an angle relative to said rake face toward said cutting edge of said insert in a plane that is substantially orthogonal with respect to said axis of rotation such that said stream impinges said interface from a direction in which said rake face faces to lubricate and cool the same and to remove said chips without interference from any shoulder portion defined by a cut in said workpiece, said nozzle assembly having means for adjusting both said angle of said stream and a path of said stream parallel to said axis of rotation including a threaded base having one end that is rotatably movable in a threaded opening in the toolholder body and a second end connected to a nozzle head.

2. The improved toolholder assembly of claim 1, wherein said adjustment means further includes a locking means for securing the threaded base of said nozzle assembly means at a selected depth and selected angular orientation with respect to said toolholder body to orient said nozzle head such that said coolant stream is directed at a desired angle in said plane and at a desired pint of said interface.

3. The improved toolholder assembly of claim 1, wherein said threaded opening in said toolholder body forms part 1 said opening means in said toolholder body.

4. The improved toolholder assembly of claim 1, wherein said threaded base includes threads having a pitch of no more than 1.0 mm per rotation.

5. An improved toolholder assembly of the type including a toolholder body having a cutting insert with a rake face having an edge for cutting a groove in a metal workpiece that moves rotationally relative to said insert about an axis wherein a groove defines at least one shoulder portion in said workpiece, and a single coolant opening means for directing a liquid coolant stream at an interface between said cutting edge and said workpiece to lubricate and cool said interface and to remove metal chips formed as a result of said cutting, said stream having a component of motion parallel with the axis of rotation, wherein the improvement comprises a nozzle assembly means for redirecting said coolant stream at an angle relative to said rake face toward said cutting edge of said insert in a path that is substantially orthogonal with respect to said axis of rotation such that said stream impinges directly on said interface from a direction in which said rake face faces without interference from any shoulder portion defined by said groove to lubricate and cool said interface and remove said chips, said nozzle assembly means including a means for adjusting both the angle of said stream in a plane that is substantially orthogonal with respect to said axis of rotation, as well as for adjusting the path of said stream parallel to said axis of rotation, wherein said adjustment means includes a threaded base having one end which is rotatably moveable in a threaded opening in said toolholder body, said threaded opening being integrally formed with said opening means in said toolholder body.

6. The improved toolholder assembly of claim 5, wherein said nozzle assembly means includes a nozzle head fluidly connected to the other end of said threaded base.

7. The improved toolholder assembly of claim 6, wherein said threaded base includes threads having a pitch of no more than 1.0 mm per rotation.

8. The improved toolholder assembly of claim 6, wherein said adjustment means further includes a locking means for securing the threaded base of said nozzle assembly means at a selected depth and selected angular orientation with respect to said tool holder body to orient said nozzle head such that said coolant stream is directed at a desired angle in said substantially orthogonal plane and at a desired point of said interface.

9. A method for improving a toolholder assembly of the type including a toolholder body having a cutting insert with an edge for cutting a workpiece that moves rotationally relative to said insert about an axis, wherein cuts made in said workpiece define at least one shoulder portion in said workpiece, and an opening means for directing a liquid coolant stream at an interface between said cutting edge and said workpiece to lubricate and cool said cutting edge and to remove chips formed as a result of said cutting, said stream having a component of motion parallel with the axis of rotation that creates interference between said coolant stream and said shoulder portion when said cut exceeds a certain depth, comprising the steps of threading said opening means in said toolholder body, and fluidly connecting a nozzle assembly means having a threaded base on one end, and a nozzle head on another end to said toolholder body by threadedly engaging said base to said threaded opening means, and redirecting said coolant stream toward said interface in a path that is substantially orthogonal with respect to said axis of rotation such that said stream impinges said interface in order to lubricate and cool the same and to remove said chips without interference from said shoulder portion regardless of the depth of a cut in said workpiece, the redirecting step comprising twisting said threaded base relative to said threaded opening means such that said nozzle head directs said coolant stream in said substantially orthogonal, interface impinging path.

10. The method for improving a toolholder assembly described in claim 9, wherein said toolholder body includes a recessed portion, and said nozzle assembly means is mounted in said recessed portion of said toolholder body to enhance the maneuverability of the resulting improved toolholder assembly.

11. A method for improving a toolholder assembly of the type including a toolholder body having a cutting insert with an edge for cutting a workpiece that moves rotationally relative to said insert about an axis, wherein cuts made in said workpiece define at least one shoulder portion in said workpiece, and an opening means having a coolant opening and being in communication with a source of pressurized coolant for directing a liquid coolant stream at an interface between said cutting edge and said workpiece to lubricate and cool said cutting edge and to remove chips formed as a result of said cutting, said stream having a component of motion parallel with the axis of rotation that creates interference between said coolant steam and said shoulder portion when said cut exceeds a certain depth, comprising the steps of:

plugging said coolant opening;

creating a threaded opening in said toolholder body that communicates with said opening means in communication with said pressurized coolant source;

fluidly connecting a nozzle assembly means having a threaded base and nozzle head to said threaded opening by screwing said base into said threaded opening, and redirecting said coolant stream through said nozzle head toward said interface in a path that is substantially orthogonal to the axis of rotation of the workpiece such that said stream impinges said interface without interference from said shoulder portion regardless of the depth of a cut in said workpiece, the redirecting step comprising twisting said threaded base relative to said threaded opening.

* * * * *